US011604901B2

(12) United States Patent
Sion

(10) Patent No.: US 11,604,901 B2
(45) Date of Patent: Mar. 14, 2023

(54) SYSTEMS AND METHODS FOR USING EXTENDED HARDWARE SECURITY MODULES

(71) Applicant: PRIVATE MACHINES INC., Brooklyn, NY (US)

(72) Inventor: Radu Sion, Brooklyn, NY (US)

(73) Assignee: Private Machines Inc., Brooklyn, NY (US)

( * ) Notice: Subject to any disclaimer, the term of this patent is extended or adjusted under 35 U.S.C. 154(b) by 184 days.

(21) Appl. No.: 16/889,704

(22) Filed: Jun. 1, 2020

(65) Prior Publication Data

US 2020/0293698 A1 Sep. 17, 2020

Related U.S. Application Data

(63) Continuation of application No. 15/537,408, filed as application No. PCT/US2015/056197 on Oct. 19, 2015, now Pat. No. 10,706,182.

(Continued)

(51) Int. Cl.
*G06F 21/87* (2013.01)
*G06F 21/72* (2013.01)
(Continued)

(52) U.S. Cl.
CPC ............ *G06F 21/87* (2013.01); *G06F 21/606* (2013.01); *G06F 21/72* (2013.01); *H04L 9/00* (2013.01);
(Continued)

(58) Field of Classification Search
CPC ........ G06F 21/87; G06F 21/606; G06F 21/72; H04L 9/00; H04L 9/3226; H04L 2209/12; H04L 9/0844; H04L 9/3265
See application file for complete search history.

(56) References Cited

U.S. PATENT DOCUMENTS 6,684,326 B1 1/2004 Cromer et al.
7,788,491 B1 * 8/2010 Dawson ................ H04L 9/3271
713/168

(Continued)

FOREIGN PATENT DOCUMENTS

CN 101061714 A * 10/2007 ............. H04H 60/23
CN 103236934 A * 8/2013 ......... G06F 21/6209
(Continued)

OTHER PUBLICATIONS

Bleikertz S., Bugiel S., Ideler H., Numberger S., Sadeghi AR., Client-Controlled Cryptography-as-a-Service in the Cloud. In: Jacobson M., Locasto M., Mohassel P., Safavi-Naini R. (eds) Applied Cryptography and Network Security. ACNS 2013. Lecture Notes in Computer Science, vol. 7954. Springer, Berlin, Heidelberg.

(Continued)

*Primary Examiner* — Sher A Khan
(74) *Attorney, Agent, or Firm* — The Law Office of Daniel T. Weglarz, P.C.

(57) ABSTRACT

An extended hardware security module ("HSM") possessing additional security properties relative to conventional HSMs and methods for initializing, deploying, and managing such extended HSMs in a networked environment. In the preferred embodiment, an extended HSM includes additional hardware and software components that configure it to run sensitive client tasks on demand inside a cloud-hosted, anti-tamper HSM housing so as to ensure sensitive data is encrypted when stored or processed outside the housing. Methods for initializing, deploying, and managing provide a framework through which extended HSMs may be secured from their initial assembly through their availing for use and actual use over a network by one or more clients. Such use often entails repeated discrete sequential secure sessions and concurrent discrete secure sessions.

14 Claims, 10 Drawing Sheets

Related U.S. Application Data

(60) Provisional application No. 62/108,173, filed on Jan. 27, 2015, provisional application No. 62/094,948, filed on Dec. 19, 2014.

(51) Int. Cl.
*G06F 21/60* (2013.01)
*H04L 9/00* (2022.01)
*H04L 9/32* (2006.01)

(52) U.S. Cl.
CPC ........ *H04L 9/3226* (2013.01); *H04L 2209/12* (2013.01)

(56) References Cited

U.S. PATENT DOCUMENTS

| | | | | |
|---|---|---|---|---|
| 8,140,847 | B1* | 3/2012 | Wu | G06F 21/645 |
| | | | | 713/175 |
| 8,219,493 | B2* | 7/2012 | Gupte | H04N 7/163 |
| | | | | 705/52 |
| 8,776,249 | B1* | 7/2014 | Margolin | H04L 63/0471 |
| | | | | 380/42 |
| 8,914,637 | B2* | 12/2014 | Osborne | H04L 9/3247 |
| | | | | 713/150 |
| 9,225,720 | B1* | 12/2015 | Chandrasekhar | H04L 63/10 |
| 9,426,154 | B2 | 8/2016 | Fitzgerald et al. | |
| 2001/0033012 | A1* | 10/2001 | Kommerling | G06K 19/073 |
| | | | | 257/679 |
| 2005/0120272 | A1* | 6/2005 | Smith | G06F 11/3664 |
| | | | | 714/38.1 |
| 2005/0231738 | A1* | 10/2005 | Huff | G06Q 10/10 |
| | | | | 358/1.1 |
| 2005/0257057 | A1* | 11/2005 | Ivanov | H04L 9/3268 |
| | | | | 713/171 |
| 2007/0051799 | A1* | 3/2007 | Kim | G07F 7/1083 |
| | | | | 235/382 |
| 2007/0103984 | A1* | 5/2007 | Kavuri | G06F 3/0631 |
| | | | | 365/185.17 |
| 2008/0025513 | A1* | 1/2008 | Lietzke | H04L 9/0897 |
| | | | | 380/277 |
| 2008/0082708 | A1* | 4/2008 | Wong | G06F 13/37 |
| | | | | 710/111 |
| 2008/0163212 | A1 | 7/2008 | Zimmer et al. | |
| 2009/0292926 | A1* | 11/2009 | Daskalopoulos | H04L 67/125 |
| | | | | 380/259 |
| 2010/0050251 | A1* | 2/2010 | Speyer | G06Q 10/06 |
| | | | | 726/20 |
| 2011/0093939 | A1* | 4/2011 | Barbour | H04L 63/105 |
| | | | | 726/16 |
| 2011/0131422 | A1 | 6/2011 | Shear et al. | |
| 2011/0214171 | A1* | 9/2011 | Wolfond | G06F 21/43 |
| | | | | 726/7 |
| 2011/0282915 | A1* | 11/2011 | Steer | H04L 63/06 |
| | | | | 713/168 |
| 2011/0299613 | A1 | 12/2011 | Duff et al. | |
| 2011/0302406 | A1 | 12/2011 | Machani | |
| 2011/0307714 | A1 | 12/2011 | Comrie et al. | |
| 2012/0102307 | A1 | 4/2012 | Wong | |
| 2012/0324230 | A1 | 12/2012 | Osborne et al. | |
| 2013/0219164 | A1* | 8/2013 | Hamid | H04L 63/0485 |
| | | | | 713/150 |
| 2013/0254117 | A1 | 9/2013 | Von Mueller et al. | |
| 2014/0108825 | A1* | 4/2014 | O'Loughlin | H04L 9/3273 |
| | | | | 713/193 |
| 2014/0282936 | A1 | 9/2014 | Fitzgerald et al. | |
| 2015/0052592 | A1* | 2/2015 | Erlingsson | G06F 21/6281 |
| | | | | 726/4 |
| 2015/0379306 | A1* | 12/2015 | Zimmer | G06F 21/72 |
| | | | | 713/193 |

FOREIGN PATENT DOCUMENTS

| | | | | |
|---|---|---|---|---|
| CN | 102523158 B | | 7/2014 | |
| EP | 2526908 A1 | | 11/2012 | |
| EP | 2799908 A1 | | 11/2014 | |
| JP | 4188584 B2 * | | 11/2008 | ............ H04L 67/34 |
| WO | WO-2007148258 A2 * | | 12/2007 | ............ G06F 21/57 |
| WO | WO-2010040629 A2 * | | 4/2010 | ............ G06F 21/34 |

OTHER PUBLICATIONS

Bleikertz et al., Client-Controlled Cryptography-as-a-Service in the Cloud, Springer-Verlag Berlin Heidelberg, 2013, pp. 19-36.

Zissis et al., Addressing Cloud Computing Security Issues, Future Generation Computer Systems, 2012, pp. 583-592, vol. 28, Issue 3, Elsevier Science Publishers B. V., Amsterdam, The Netherlands.

* cited by examiner

SYSTEMS AND METHODS FOR USING EXTENDED HARDWARE SECURITY MODULES

CROSS REFERENCE TO RELATED APPLICATIONS

This application is a continuation of co-pending application Ser. No. 15/537,408, filed Jun. 17, 2017, which is the National Stage of International Application No. PCT/US15/56197, filed Oct. 19, 2015, which claims the benefit of and incorporates by reference the following U.S. provisional patent applications: application with Ser. No. 62/108,173, filed in the United States on Jan. 27, 2015; and application with Ser. No. 62/094,948, filed in the United States on Dec. 19, 2014.

BACKGROUND OF THE INVENTION

Field of the Invention

This invention relates to methods and apparatus for initializing, deploying, and managing hardware security module ("HSM") style devices having additional security properties in a networked environment.

Description of the Existing Art

The exponential growth and advances in cheap, high-speed communication allow for unprecedented levels of global information exchange and interaction. As a result, new market forces emerge that propel toward a fundamental, cost-efficient paradigm shift in the way computing is deployed and delivered: computing outsourcing.

Outsourcing may minimize users' overheads and enable them to benefit from a service provider's global expertise consolidation and bulk pricing. It may be finally possible to efficiently provide computing in a scalable, on-demand, and virtualized manner through the Internet. Many established companies, such as Google Inc., Amazon.com, Inc., and Microsoft Corporation, are rushing to offer increasingly complex storage and computation services. These services and their globally distributed support infrastructures are commonly referred to as "cloud computing."

Cloud computing employs dynamically virtualized and scalable resources that are provided as a service over the Internet. Its users need not have knowledge of, expertise in, or ownership of the technology infrastructure in the "cloud" that supports them. Cloud services are provided at each layer in the technology stack, including: infrastructure as a service (IaaS), platform as a service (PaaS), and at the application layer (software as a service—SaaS, business process as a service—BPaaS, and knowledge as a service—KaaS, among others). Applications "in the cloud" are typically accessed online through a web browser. The software, data model, and associated business knowledge are hosted by the cloud.

Nevertheless, significant challenges lie in the path to successful large-scale adoption. Business, healthcare, intelligence, defense, and government clients are often unwilling to risk cloud deployment of sensitive digital assets and business processes under the control of a remote, third-party provider. Practical, technology-backed assurances of full privacy and confidentiality are essential for clouds to become a sound and truly viable alternative. Unfortunately, it is generally understood that today's providers cannot make or deliver on such assurances.

As a result, current major obstacles to cloud adoption include security and privacy. Potential cloud clients and current adopters, in numerous surveys, time and again, name security and privacy as the top concerns preventing cloud adoption, including potential clients and current adopters throughout the American, Asia Pacific, and European markets. Simply put, numerous clients will forgo tremendous benefits in on-demand scalability, quality, and cost, and deploy expensive, in-house information technology ("IT") departments rather than risk unauthorized access to their data or business logic.

In reaction to clients' security and privacy concerns, providers have tried to respond with ideas built around existing technology. This has resulted in increased deployment of traditional security mechanisms—including intrusion detection mechanisms, cloud-based malware scanners, SPAM gateways—to protect the cloud and its client tenants from external threats.

Further, some providers have tried to alleviate regulatory-driven data locality concerns via virtual private cloud ("VPC") mechanisms in which, for an additional premium, a physical or logical portion of the cloud in a specific location is dedicated to a specific client.

Finally, to ensure a certain level of isolation between individual clients' data and workloads, vendors are commonly relying on two mechanisms: hardware virtualization and trusted platform modules.

In clouds, virtualization has been deployed successfully to both share a limited number of physical resources (i.e., physical servers) and isolate clients by running their workloads inside separated guest virtual machines ("VM") or even entire networks. Individual guest VMs endowed with varying levels of actual, underlying physical resources (e.g., memory and CPU cores) are purchased by each client separately, and the cloud provider's underlying virtualization software aims to guarantee a certain level of isolation between them.

Further, clients may require guarantees that the provider is indeed running the expected virtualization software and are pre-loading the purchased guest VMs with expected operating systems software. This may be ensured by remote attestation ("RA").

Traditionally, RA has been deployed by software and media companies to identify unauthorized changes to remotely running software, including tampering with their software by users to circumvent technological protection measures, such as digital rights management enforcements for multimedia content.

In a cloud computing context, a certificate may be provided to the client (e.g., by the cloud vendor) to "attest" that the virtualization software and guest operating system software inside the purchased VMs are those expected. Indeed, the use of basic remote attestation with trusted platform modules ("TPM") in general and in cloud environments in particular is well established.

Unfortunately, however, the significant privacy concerns typically raised in all cloud adoption surveys remain unaddressed. The problem remains that TPMs do not provide the ability to perform computations internally and, in traditional clouds, the provider, any data center operators, or untrusted insiders all require unfettered physical access to the underlying infrastructure and, thus, inherently have unfettered physical access to the underlying hardware and its hosted business data and software. Thus, TPMs and virtualization technologies still fail to provide the desired level of assurances of computation privacy and data confidentiality against parties with full physical access to the virtualized hardware.

To circumvent some of the above problems stemming from physical access by insiders, vendors have also deployed cryptographic hardware in the cloud. Unfortunately, access to the HSMs is mediated by the cloud itself. For example, to transfer a secret key to an HSM requires the user to send that key through a channel that the cloud provider can read. Thus, no privacy is achieved since the data center operator, the provider, and its insiders can read the user secret keys.

Further, while such approaches may mitigate some of the concerns and keep encryption keys (inside HSMs) and data (encrypted) out of reach of insiders during periods of rest, when client software is not running, significant problems still exist. During processing, at runtime, clients' data need to be decrypted and transferred to the client code running inside cloud-provided virtual machines. As before, these virtual machines are running on traditional unsecured hardware and their memories and CPUs are accessible to any data center operators or untrusted insiders, all of who require unfettered physical access to the underlying infrastructure. As a result, such technologies still cannot provide assurances of computation privacy and data confidentiality against parties with full physical access to the virtualized hardware.

Therefore, there remains a need for methods and apparatus that can provide full computation privacy and data confidentiality for sensitive digital assets and business processes even when run and housed, respectively, under the control of a remote, third-party cloud provider.

The invention described herein provides for methods and apparatus for initializing, deploying, and managing HSM style devices ("extended HSM," or "security extending HSM," or "SXHSM") in a networked environment in a manner that enables the running of sensitive client tasks inside cloud-hosted, tamper-respondent HSMs and ensures sensitive data and code are encrypted when stored or processed outside. As a result, many of the limitations imposed by the existing art are removed.

Unless otherwise specified, $E_k(x)$ will denote the encryption of message x with key k, and $D_k(x)$ will denote the decryption of message x with key k.

As referenced herein, $S_{SK}(x)$ denotes the electronic signature of message x by a signer uniquely identified by identifier SK. In the case of a digital signature, SK may represent a private key of the signer in a public/private key cryptographic system. A party with access to the corresponding public key of the signer may verify the signature. For simplicity, unless specified otherwise, the notation $S_{SK}(x)$ implies that a party may also extract the actual message x from $S_{SK}(x)$.

Unless specified otherwise, hash functions are denoted herein using the letter h, e.g., as in h(x).

As referred to herein, a Diffie-Hellman (DH) key exchange allows two parties, Alice and Bob, that have no prior knowledge of each other to jointly establish a shared secret key over an insecure communications channel. This key may then be used to encrypt subsequent communications using a symmetric key cipher. For illustration, consider the simplest, original implementation of the DH protocol, which uses the multiplicative group of integers modulo p, where p is a prime, and g is a primitive root modulo p.

Step 1. Alice and Bob agree on acceptable values for p and g.
Step 2. Alice picks a secret integer a, and sends Bob the value $A=g^a$ mod p.
Step 3. Bob picks a secret integer b, and sends Alice the value $B=g^a$ mod p.
Step 4. Alice computes $B^a$ mod p, which equals $s=g^{ba}$ mod p.
Step 5. Bob computes $A^b$ mod p, which also equals $s=g^{ab}$ mod p.
Step 6. Both Alice and Bob now share a "master secret" s that no illicit eavesdropper can compute efficiently under the commonly-held assumption that the "discrete logarithm problem"—the problem of finding a being given $g^a$ mod p—is difficult.

DH by itself does not provide authentication of the communicating parties and is thus vulnerable to a man-in-the-middle attack. Mallory may establish two distinct key exchanges, one with Alice and the other with Bob, effectively masquerading as Alice to Bob, and vice versa, allowing her to decrypt, then re-encrypt, the messages passed between them. To prevent a man-in-the-middle attack, various improvements have been devised, including having both Alice and Bob endowed with certified public/private key pairs and then sign the A and B messages respectively, using their respective public key credentials.

SUMMARY OF THE INVENTION

An extended HSM possessing additional security properties relative to conventional HSMs and methods for initializing, deploying, and managing such extended HSMs in a networked environment. In the preferred embodiment, an extended HSM includes additional hardware and software components that configure it to run sensitive client tasks on demand inside a cloud-hosted, anti-tamper HSM housing so as to ensure sensitive data is encrypted when stored or processed outside the housing. Methods for initializing, deploying, and managing provide a framework through which extended HSMs may be secured from their initial assembly through their availing for use and actual use over a network by one or more clients. Such use often entails repeated discrete sequential secure sessions and concurrent discrete secure sessions.

In one embodiment of the present invention, an extended HSM may be configured for first-time deployment initialization by having the extended HSM generate an asymmetric encryption algorithm encryption/decryption key pair, reveal the encryption key to a user, and receive and store a signed encryption key certificate. Further, the extended HSM may be configured to receive and store an ownership token.

In another embodiment of the present invention, an extended HSM may be configured to require receipt of an ownership token before receiving and storing a signed encryption key certificate.

In another embodiment of the present invention, an extended HSM may be configured to require receipt of an ownership token before replacing it with a newly received ownership token.

In another embodiment of the present invention, a controller may be configured to receive, decrypt, authenticate, and store meta-information uniquely identifying an extended HSM.

In another embodiment of the present invention, a controller may be configured to receive, decrypt, authenticate, and respond to management requests, defined herein as requests to impact the internal or operational state of an SXHSM. Such requests include allocation requests, de-allocation requests, and networking-related changes.

In another embodiment of the present invention, a user may establish a communication key with an extended HSM. Further, the user may send encrypted and authenticated executable code to said HSM.

In another embodiment of the present invention, an extended HSM may be configured to receive, decrypt, authenticate, and load system software.

In another embodiment of the present invention, an extended HSM may be configured to receive, decrypt, authenticate, and load software applications.

In another embodiment of the present invention, a user may submit to a controller an allocation request including a reservation token. Further, the controller may be configured to send the reservation token to an extended HSM. The extended HSM may be configured to verify that a user knows the reservation token before establishing a communication key with the user.

It is an object of this invention to provide methods and apparatus operable to provide full computation privacy and data confidentiality for sensitive digital assets and business processes even when run and housed, respectively, under the control of a remote, third-party cloud provider. In accordance with the same, cloud-hosted anti-tamper extended HSMs may be designed to be securely re-programmed on-demand, to perform arbitrary security and privacy-sensitive tasks on behalf of clients. Thus, even insiders with physical access to the device may be unable to read, tamper with, or monitor the data and tasks running inside the extended HSMs.

The forgoing and other objects will be apparent to one of skill in the art.

DETAILED DESCRIPTION OF THE INVENTION

Extended HSM Device

External Housing.

Figure 1:
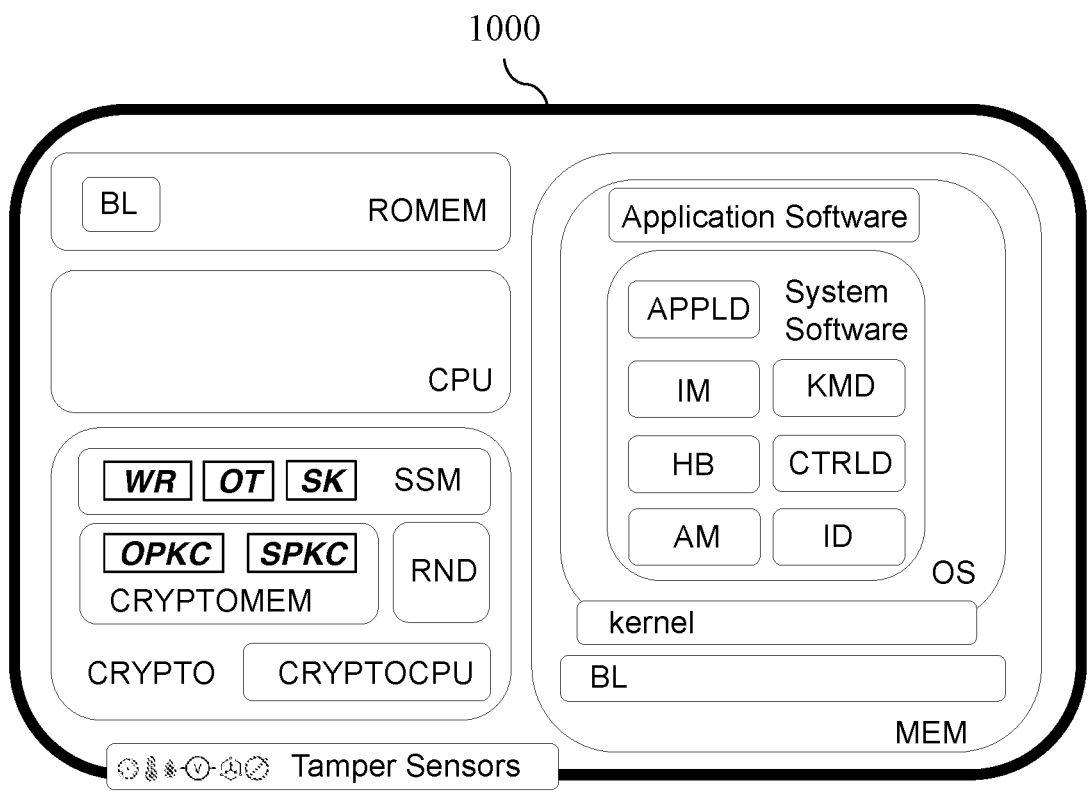
FIG. 1 is a schematic showing the basic components of an extended HSM built in accordance with the present invention.

Referring now to the drawings and in particular FIG. 1, the housing of an SXHSM is defined by an anti-tamper enclosure 1000. For purposes of this disclosure, the phrase "anti-tamper" includes tamper resistant, tamper proof, tamper evident, tamper respondent, and the like, or any combination thereof. It is recognized that generally, the phrases "anti-tamper system" and "anti-tamper device" may be used interchangeably with the phrase "anti-tamper enclosure."

For example, a "tamper-respondent" device may "react" to illicit attacks. Typically, such a device includes the use of a strong physical enclosure and tamper-detection or tamper-response circuitry that zeroes out stored Critical Security Parameters (CSPs) during a tampering attempt (i.e., when the device's security may be compromised).

As SXHSMs may be used to store highly sensitive information, it is important that SXHSMs in accordance with the present invention prevent such information from being accessed by malicious parties or otherwise falling into the wrong hands. It is contemplated that, to access internally-stored information, malicious parties may mount various physical attacks in addition to electronic-based attacks. Such physical attacks may include removal of covers or any potting material so as to enable identification of the location and function of any existing security defenses and the bypassing of such defenses to allow access to the next layer of protection.

To address such a potential vulnerability, SXHSMs employ the anti-tamper enclosure 1000 that may react to illicit attacks to encapsulate the internal core processing circuitry performing the SXHSM's core functionality. In accordance with conventional anti-tamper enclosures, the anti-tamper enclosure 1000 includes the use of a strong physical enclosure having integrated tamper sensors (or TS) and tamper detection/response circuitry operative to zero out CSPs stored in the SXHSM's secure storage memory (or SSM) when compromised (or possibly compromised) due to unauthorized attempts.

A number of standards exist that define security properties of conventional anti-tamper enclosures with physical security assurances. For example, the National Institute of Standards and Technology (or NIST) issued the Federal Information Processing Standard (or FIPS) 140 Publication Series to coordinate the requirements and standards for cryptography modules that include both hardware and software components. The standard provides four increasing, qualitative levels of security intended to cover a wide range of potential applications and environments. The security requirements cover areas related to the secure design and implementation of a cryptographic module. These areas include cryptographic module specification; cryptographic module ports and interfaces; roles, services, and authentication; finite state model; physical security; operational environment; cryptographic key management; electromagnetic interference/electromagnetic compatibility (or EMI/EMC); self-tests; design assurance; and mitigation of other attacks.

Specifically, the current standard NIST FIPS 140-2, at its highest level, Security Level 4, mandates that the physical security mechanisms provide a complete envelope of protection around the cryptographic module with the intent of detecting and responding to all unauthorized attempts at physical access. Penetration of the cryptographic module enclosure from any direction should have a very high probability of being detected, resulting in the immediate zeroization of all CSPs.

Security Level 4 also protects against a security compromise due to environmental conditions or fluctuations outside of the normal operating ranges for voltage and temperature. Intentional excursions beyond the normal operating ranges may be used by an attacker to thwart a module's defenses. A module is required to either include special environmental protection features designed to detect fluctuations and zeroize CSPs, or to undergo rigorous environmental failure testing to provide a reasonable assurance that the module will not be affected by fluctuations outside of the normal operating range in a manner that may compromise the security of the module.

Accordingly, it is contemplated that Security Level 4 may be an appropriate standard for the SXHSM anti-tamper enclosure 1000. It is understood, however, that in some embodiments, alternate security levels (including without limitation Level 3, 2, and 1) or standards may be employed.

Internal State. As referred to herein, the "internal state" of an SXHSM refers to the information about the SXHSM comprising the totality of the SXHSM firmware, loaded code, memory, central processing unit state, caches, and any other information stored in the SXHSM modules, as well as the configuration of its contained hardware chips.

Inside the anti-tamper enclosure 1000 of an SXHSM built in accordance with the present invention, an embodiment of a SXHSM includes read-only memory (or ROMEM), a general purpose central processing unit (or CPU), a Cryptography Module (or CRYPTO), and memory (or MEM). The ROMEM and CPU define conventional read-only memory and processing elements, respectively. The CRYPTO is provided for computing cryptographic functions and includes thereon a Secure Storage Module for storing sensitive data, a Randomness Module (or RND) for providing random numbers, a secure cryptoprocessor (or CRYPTOCPU), and cryptographic memory (or CRYPTOMEM). The MEM defines one or more conventional computer data storage devices. Stored in the MEM is an Identity Module (or IM) for generating a network identity; a Heartbeat Daemon (or HB) for sending meta-information; a Control Daemon (or CTRLD) component for receiving and executing commands; an Authentication Module (or AM) for authenticating commands; a Randomness Collector Daemon (or RCD) component for collecting randomness from any available randomness sources; an Interface Daemon (or ID) component for managing communication interfaces; a Key Management Daemon (or KMD) component for managing cryptographic credentials; an Application Loader (or APPLD) component for managing software application loading; and selected operating and application software.

It is appreciated that a SXHSM may include one or more logical layers. Examples of such logical layers include a bootloader (or BL), a kernel, an operating system (or OS) image, system software, and application software running inside the OS. It is additionally appreciated that the BL may comprise one or more logical layers. Examples of such logical layers include hardware initialization routines, network logic, and a kernel loader.

In one embodiment, the network logic may create a temporary or permanent network identity (examples include a physical network interface address and IP address) and interact with one or multiple servers to generate a permanent network identity, and download any code belonging to other layers, such as the kernel and OS.

It is contemplated that the BL or parts thereof may be stored in ROMEM or other memory location that is designed to prevent unauthorized parties from altering the BL and allow authorized parties to do so, so as to prevent its unauthorized alteration and/or enable authorized alteration.

Figure 2:
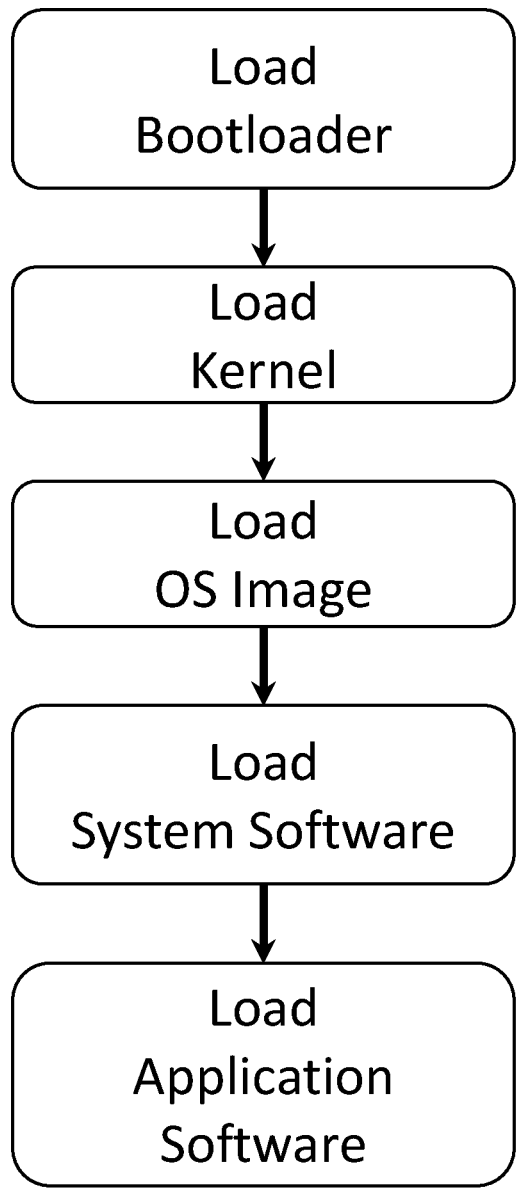
FIG. 2 shows the steps of an exemplary booting and loading sequence for an extended HSM built and deployed in accordance with the present invention.

Referring now to FIG. 2, it is appreciated that various startup routines may be employed. For example, in one embodiment, when the SXHSM is powered on, it may load and run the BL, which may use its kernel loader to load and run the kernel, which may load and run the OS, which may load and run system software and application software.

Production

Figure 3:
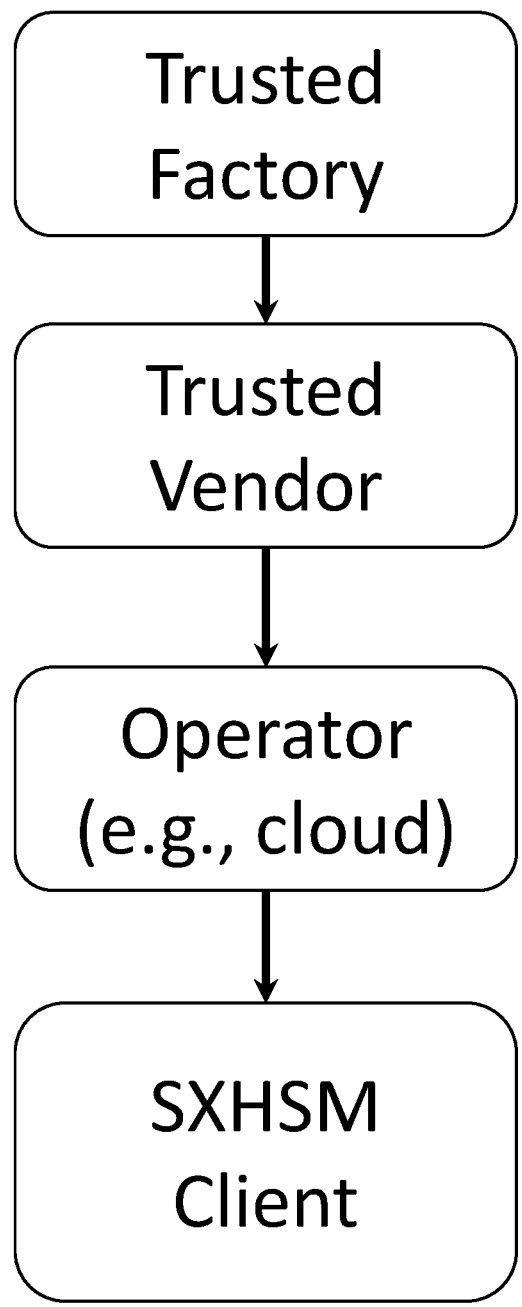
FIG. 3 shows the steps of an exemplary trust chain for an extended HSM built and deployed in accordance with the present invention.

Referring now to FIGS. 2 and 3, before an SXHSM can be securely deployed in accordance with the present invention, it must be produced in a manner that enables a provision of security assurances. Accordingly, it is contemplated that after the design of the anti-tamper enclosure has been certified according to NIST FIPS specifications, an SXHSM is manufactured by a trusted hardware factory (or TF) for a trusted HSM vendor (or TV). The TF receives key parts of the SXHSM firmware from the TV and faithfully integrates them into the SXHSMs. For example, key firmware parts may include portions of the code running in the CRYPTOCPU, and code portions of the BL. It is appreciated that the BL code portions may me embedded in read-only SXHSM memory by the TF.

This process results in the production of a "factory-fresh" SXHSM, defined as a freshly-produced SXHSM ready to leave the factory and be delivered to its TV.

Ownership

It is understood that a vendor of HSMs may produce hardware for multiple operators (e.g., different cloud providers or financial institutions). Further, after receiving SXHSMs from the factory, vendors may want to customize the units or perform other modifications. This would require extended access to the SXHSM's data interfaces and internal state. To preserve integrity and their internal security model, however, SXHSM operators may want to ensure that, once delivered, the vendor's role becomes strictly limited to that of a SXHSM producer and nothing more. Specifically, the vendor should not be able to alter or access the internal state of the SXHSMs after deployment.

Figure 4:
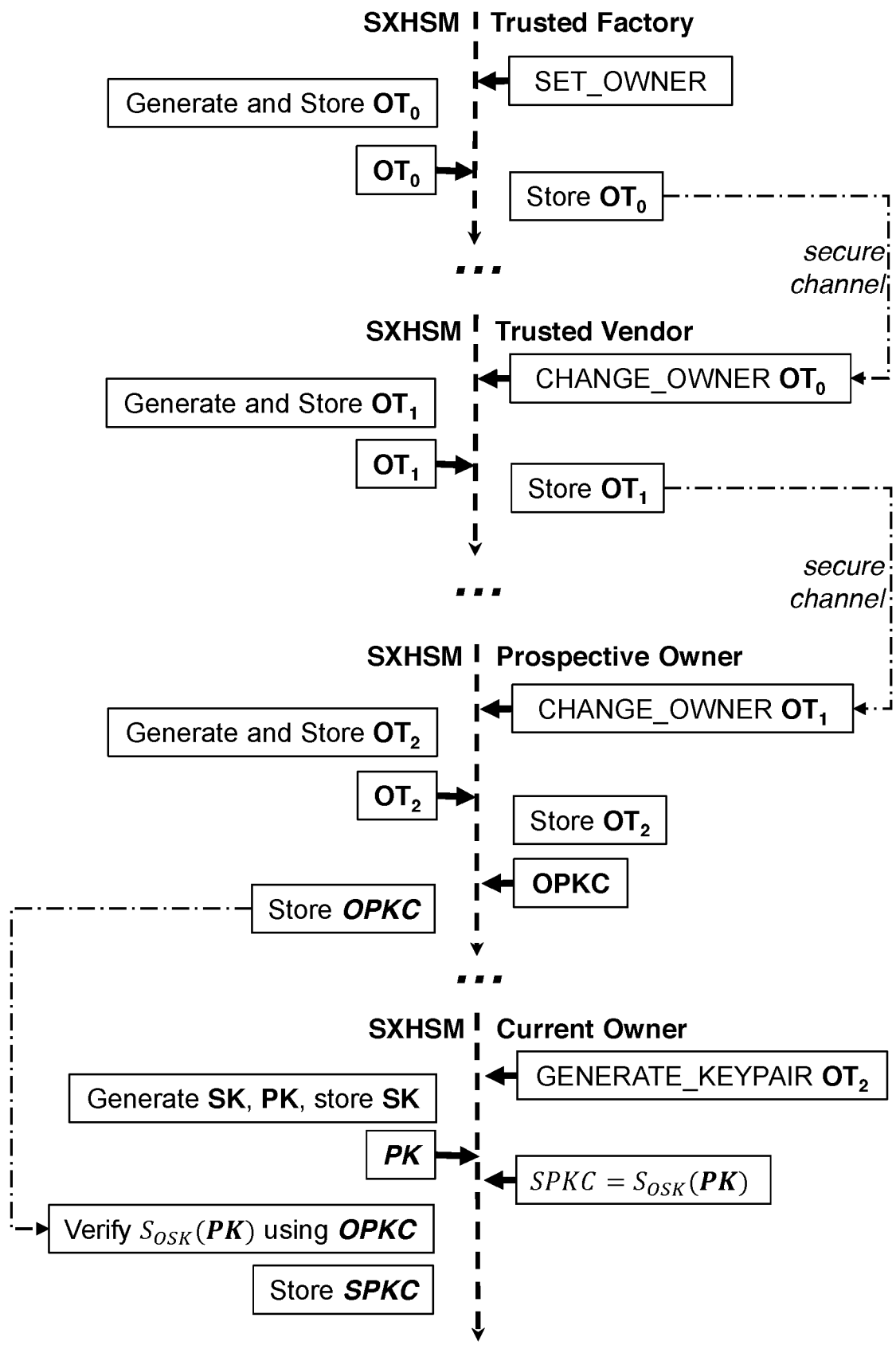
FIG. 4 shows a process flow of an ownership token and owner public key certificate for an extended HSM built and deployed in accordance with the present invention.

Referring now to FIGS. 3 and 4, SXHSMs implement a concept of "ownership" to enable a party to selectively access and modify its internal state while selectively restricting other parties from doing the same. A SXHSM in accordance with the present invention may be initially programmed to allow the first party that accesses it for the purpose of viewing and/or modifying its internal state—either physically or through a communication conduit—to assert "ownership."

In one embodiment, ownership is asserted through the use of an ownership token (or OT). This process may begin with a prospective owner sending a SET_OWNER message to the SXHSM. In some embodiments, the SET_OWNER message contains an OT, while in some embodiments, the OT is generated by the SXHSM. It is contemplated that the SXHSM may store the OT in its SSM.

In one embodiment, a party may assert ownership by proving knowledge of the OT. Such ownership may entail knowledge of an external ownership token derivate (or EOTD), which is a token that satisfies a certain agreed-upon ownership token relationship (or OTR) with the OT stored by the SXHSM. In such a scenario, it is acknowledged that the OTR may be different from equality.

In one embodiment, the EOTD may be a physical device that may get connected physically to the SXHSM, for example, through a communication port, data port, or control panel.

In one embodiment, ownership may entail the ability to generate "single-use EOTDs," which are EOTDs that may be used only a finite number of times or within a given time frame and, thus, may prevent an unauthorized party from reusing a previously used EOTD. In such an implementation, a number of valid EOTDs may exist that satisfy the OTR for a given SXHSM's OT. As such, any and all parties knowing at least one of these valid EOTDs are considered owners of the SXHSM. It is appreciated that the EOTDs may be provided to the SXHSM during manufacture or subsequent to manufacture.

In some embodiments, the SET_OWNER message may be created by agreement between multiple parties. Thus, a notion of "collective ownership" may be implemented, in which one or more "partial owner" parties may need to participate with an individual ownership token derivate share (or IOTDS) together in order to assert ownership. In such a scenario, the IOTDSs may be used by a number of parties to collectively compute a value that may be provided to the SXHSM. It is contemplated, however, that in some embodiments, all of the IOTDSs may not be required to in order for ownership to be established or acted upon. Indeed, in some instances, a notion of "collective ownership" may be established if a subset of the IOTDSs and the OT are in a certain agreed-upon relationship. It is appreciated that the IOTDSs may be provided to the SXHSM during manufacture or subsequent to manufacture.

In one embodiment, in "collective ownership" no single party may generate another party's IOTDS.

It is appreciated that any and all EOTDs, IOTDSs, and OTs, whether physical or logical, may be collectively called "ownership credentials" (or "OC").

Once ownership has been successfully established, a SXHSM may be called "owned" (as opposed to factory fresh). An owner of an SXHSM would generally have special style powers over the SXHSM. For example, one special power that an owner of a SXHSM may possess is the ability to request the SXHSM to accept new owners or otherwise change ownership. Thus, to change ownership of a SXHSM to a new owner(s), an existing owner(s) of an owned SXHSM may need to prove their existing ownership (either individual or collective) to the SXHSM. The SXHSM would then validate the existing ownership claim before accepting a change in ownership. For example, in one embodiment, a prospective owner(s) may send a CHANGE_OWNER message to a SXHSM that may include the OC of the existing owners so as to allow the SXHSM to validate the ownership claim and implement the requested change in ownership.

It is contemplated that, as a SXHSM built in accordance with the present invention would be used by different owners at various times, in some embodiments, upon receipt of a CHANGE_OWNER message, the SXHSM may automatically zeroize all or some of its internal state (including, for example, SSM or memories). Through this action, a previous user can be assured that all record of activity and data appurtenant to their use of the SXHSM will be permanently removed whenever they are replaced as the owner of the SXHSM.

Further enhancing the security of a present owner's activity and data on a SXHSM, it is contemplated that, upon receipt of a CHANGE_OWNER message, the SXHSM may automatically establish new OC with the new owners as discussed above. For example, in the case of an individual owner, this may entail establishing a new OT internally and providing it to the new owner. Thus, any OT in possession of a previous owner will no longer work to establish ownership of the SXHSM.

Factory-to-Vendor-to-Operator Trust Chain.

As illustrated in FIG. 4, it is contemplated that, in typical supply chain situations, a TF may assert ownership of one or more SXHSMs before they leave the factory. The TF may then provide necessary ownership credentials for each SXHSM to the trusted vendor through a secure communication channel. The TV may use these credentials to assert and change the SXHSM ownership before selling the SXHSM to an operator. Using a secure communication channel, the TV may provide the operator with the ownership credentials necessary to allow the operator to assert and change ownership. This mechanism may secure the factory-to-vendor-to-operator trust chain and prevent intermediaries, such as shipping services (who otherwise may attempt to assert ownership by being the first to access the SXHSM), from tampering with the SXHSMs.

Authenticating Owner to SXHSM.

It is contemplated that, in some circumstances, a SXHSM may want to confirm the authenticity of messages received from its current owner (e.g., cloud operator) without involving the ownership credentials directly, or confidentially communicate with its current owner without involving the ownership credentials directly. For example, when the available communication channels between the SXHSM and its owner (e.g., cloud) are not fully trusted, involving the ownership credentials would undermine the security level being sought in the first place. Similarly, another circumstance wherein it may be desirable to not involve ownership credentials is when it is desired to keep the authority to change ownership separate from the authority to send messages to the SXHSM.

To address such circumstances, a SXHSM may store an "owner public key certificate" (or OPKC) in its memory, SSM, or elsewhere. The OPKC corresponds to an owner private key (or OSK). Using the OPKC, the SXHSM may then authenticate messages which may be signed by the owner using OSK in accordance with asymmetric cryptography. The SXHSM may also use the OPKC to establish a secure communication channel with the owner. It is appreciated that in some embodiments, the SXHSM OT may comprise the OPKC, a signature with the owner's private key on a commonly agreed upon value known to both the SXHSM and the owner—for example, a random nonce or the current timestamp. In this regard, ownership claim validation by the SXHSM may then include simply verifying the signature.

Root of Trust

Before sending their sensitive data and code to cloud-hosted SXHSMs, cloud clients may desire assurances that a targeted cloud-hosted SXHSM indeed originates with a certain trusted vendor or operator whom the particular cloud client trusts to have procured SXHSMs correctly according to certified anti-tamper specifications. This may be achieved by judiciously applying asymmetric cryptography and having SXHSM vendors provide SXHSMs with signed public key certificates (or SPKC) stating that the SXHSMs conform to their certification standards (e.g., NIST FIPS 140-2). It is appreciated that the SPKC may include other information, such as hardware type, firmware version, certification authorities (e.g., NIST), certification information, or certification date.

The external party that has signed the SPKC is called the "root of trust" (or RoT) of the SXHSM. It is contemplated that establishing a RoT may be desirable for both factory fresh SXHSMs and owned SXHSMs. If the SXHSM is factory-fresh, it may be ready to immediately receive a GENERATE_KEYPAIR message from an external party, such as its trusted vendor, in order to begin the process of initializing, generating, and storing a SPKC certificate. In response to a GENERATE_KEYPAIR message from an external party, the factory-fresh SXHSM may internally generate an asymmetric encryption algorithm public/private key pair and return the public key to an external party. In the alternative, the asymmetric encryption algorithm public/private key pair may be generated by a third party or set of parties. In any event, the factory-fresh SXHSM may store the private key (or secret key, or SK), the public key (or PK), or both internally in the SSM or elsewhere.

In some embodiments, the external party may already have a public/private key pair, which may have been signed by a well-known trusted certificate authority (or CA) such as Symantec/Verisign, Comodo, Go Daddy, or GlobalSign to produce a public key certificate. In such an instance, the external party then uses its private key to sign the SXHSM public key and generate said SXHSM public key certificate that it may provide to the factory-fresh SXHSM for storage internally—in its memory, SSM, or elsewhere.

It is understood that, in many scenarios, the external party may be a trusted vendor. Advantageously, this SPKC generation and storage process may be repeated any number of times as long as the SXHSM is factory-fresh and un-owned, thereby allowing the TV to freely update cryptographic credentials for its factory-fresh, stocked SXHSM.

Upon taking ownership of a purchased SXHSM(s), it may be desirable by operators to modify the SXHSM and its ownership credentials so as to prevent the TV from reconfiguring the owned SXHSM credentials. This may be enforced by ensuring an owned SXHSM no longer responds to a GENERATE_KEYPAIR message at all or unless and until ownership is asserted and verified.

That said, SXHSM owners may still want to maintain their ability to facilitate the reset of the owned SXHSM credentials if required. Cases where this may occur include: a trusted vendor changing root certification keys; private keys becoming compromised; and various administrative transfers, such as a sale to another party that may decide to act as its own root of trust replacing the trusted vendor.

Accordingly, the process of initializing, generating, and storing a SPKC certificate for an owned SXHSM may require, as an initial matter, including the information necessary to claim and validate ownership in the GENERATE_KEYPAIR message sent to the owned SXHSM. The information necessary to claim and validate ownership may be provided separately and may need not be transmitted concurrently with the GENERATE_KEYPAIR message; for example it may be sent before the GENERATE_KEYPAIR is sent to an owned SXHSM. In response to a GENERATE_KEYPAIR message from an external party, once ownership is validated, the owned SXHSM may internally generate an asymmetric encryption algorithm public/private key pair and return the public key to an external party or parties. In the alternative, the asymmetric encryption algorithm public/private key pair may be generated by a third party or set of parties. In either event, the SXHSM may store the private key, the public key, or both internally in the SSM, or elsewhere, e.g., externally encrypted.

In some embodiments, the external party or parties have a public/private key pair, and in some embodiments, the external parties' public key is the OPKC. It is understood that the external parties' public key may be signed by a trusted certificate authority, such as Symantec/Verisign, Comodo, GoDaddy, or GlobalSign to produce a public key certificate.

External parties may use their private key to sign the SXHSM public key and generate said SXHSM public key certificate, which they then provide to the SXHSM for storage internally—in its memory, SSM, or elsewhere.

In accordance with the instant invention, a SXHSM is considered initialized when it stores an ownership token, a private key SK, and a public key certificate for the public key corresponding to SK. Once initialized, SXHSMs may be deployed in various networked configurations, such as clouds, local area networks, enterprise networks, and wide area networks. In these environments, the SXHSMs may be accessed by remote clients to execute sensitive code and access sensitive data.

Further, once it is initialized, it is contemplated that the RoT public key certificate of the SXHSM may be made known to all remote clients, thereby enabling remote clients to verify an SXHSM's signed SPKC using the SXHSM's RoT (e.g., the trusted vendor) public key certificate. Thus, by proving to remote clients that it knows the private key (SK) corresponding to the signed SPKC, an SXHSM may effectively prove that the RoT of the SXHSM has been present when this specific SXHSM has generated its key pair.

It is appreciated that the SPKC may contain additional information, including information provided by the SXHSM RoT (e.g., the trusted vendor), information for determining the SXHSM hardware and firmware versions, certifications, and lifecycle data.

Trust Chain

Once clients are able to identify a remote SXHSM as being indeed produced by a trusted vendor, clients may also want to ensure that the SXHSM is in a secure state that matches clients' expectations (e.g., the correct firmware, operating system, applications, and networking state). This is especially important in systems that allow SXHSMs to be (re)used over time by multiple mutually-mistrusting clients, which could even be potentially commercially competing enterprises. In one embodiment, ensuring that the SXHSM is in a secure state is achieved by deploying remote attestation mechanisms that keep track securely of important state changes associated to the SXHSM by "witnessing" information describing these state changes as precisely as needed. As such, it is contemplated that state change events may be described by a value and the process of witnessing events may be defined as the process of witnessing that value. It is contemplated, however, that for such a witnessing to be effective for its purpose, information already witnessed may not be repudiated. For example, the string "loading operating system v3.30" concatenated with a cryptographic hash of the loaded operating system code, e.g., "de9f2c7fd25e1b3afad3e85a0bd17d9b100db4b3," may constitute precise-enough information to describe the operating system loading event and the associated state change.

In addition, witnessing may track information about state change events, such as downloading, loading, running, and generating network identities. It is recognized, however, that in some embodiments, witnessing of any information, even unrelated to state changes, may also be implemented.

In one embodiment, witnessing of information may entail executing a special function, witness( ), that may take as a parameter the information to be witnessed; for example, witness ("loading kernel v1.1 with SHA digest 2fd4e1c67a2d28fced849ee1bb76e7391b93eb12").

In some embodiments, witnessing may require maintaining of a "witness register" (or WR), a value that may comprise a digest of the already witnessed information items. Accordingly, WR is said to have been "witness to" said information items. As such, for the attestation system to be effective, certain levels of protection for the WR must be provided. In some embodiments, the WR may be unforgettable, indelible, and/or may not be changed arbitrarily or in an unauthorized manner, but may be used only to witness information. Moreover, some embodiments enable a party to be able to validate whether a given WR corresponds to an ordered list of information items.

It is contemplated that witnessing may be performed with support from the crypto chip, which may be programmed with special code for this purpose, and the WR may be maintained by the crypto chip and/or may be internal to the crypto chip. As the witness(x) function may be implemented by the crypto chip, it is contemplated that calling the function witness(x) function may change the WR as follows:

$$WR = h(WR|x|WR)$$

where h( ) is a cryptographic hash function and "|" denotes concatenation. It is understood that many other combinations of cryptography and hash functions are possible in the construction of the witness function, including the following:

$$WR = h(WR|h(x)|WR)$$

$$WR = h(WR|h(x|WR))$$

$$WR = h(WR \oplus h(x) \oplus WR)$$

State changes at varying degrees of granularity may be witnessed. One example may be witnessing the transitions from the bootloader to the kernel, from the kernel to the operating system, and from the operating system to the application. Another example may be witnessing individual events of loading and unloading applications within the operating system.

As a security concern, it is contemplated that, in a typical embodiment, the SXHSM is operated to ensure any internal state, register (including the WR), memory, or other component that may have been impacted by a previous client's code or data presence, gets reset and zeroized at every power cycle. This may ensure a fully fresh start in a known secure state for any next client. A correctly functioning SXHSM just after electrical power-on, before executing any code, is said to be in an "initial secure state" (or "S0").

In some implementations, witnessing would commence from the moment the SXHSM is in state S0, while in others, witnessing may start from a later point when the SXHSM is in a different state, such as the moment after the bootloader may already have been loaded.

Through the witnessing routine, the SXHSM generates an ordered set of information items witnessed since the last power-up, called the "witnessed set." In one embodiment, a verifier may be able to validate whether a given witnessed set corresponds to a given WR. To this end, the verifier may perform a separate witnessing operation for each element in the witnessed set into a different witness register (or RR) and then check whether the resulting value of RR equals WR. The witnessing mechanisms may also allow a verifier, such as a remote client or another party, to validate a list of claimed state changes—starting from an agreed-upon secure state (e.g., S0)—against the current WR value. A match may provide the verifier an accurate picture and assurances about the current state of the SXHSM; for example, the already-loaded logical layers and the currently running software.

Secure Management of Networked SXHSMs

While each particular SXHSM may provide a secured ecosystem in which clients can execute sensitive code and store or access sensitive data, in order for a plurality of such devices to be deployed in remote settings for access by multiple clients, a number of SXHSMs may be able to be managed in a networked environment. This is a task that may involve a number of security and efficiency challenges, including having to securely keep track of the status of available SXHSMs without allowing malicious or untrusted entities to interfere or impersonate a SXHSM, provisioning SXHSMs dynamically on-demand for individual clients with full security guarantees, and maintaining the chain of trust provided by the SXHSM design. Moreover, all these challenges may be made more difficult as SXHSMs are generally designed to limit the level of trust the clients are required to place in the management authority of the SXHSMs (e.g., cloud provider).

To illustrate how a set of SXHSMs may be connected together through a computer network and availed to remove users, a cloud data center will be provided as an example of such an environment.

Figure 5:
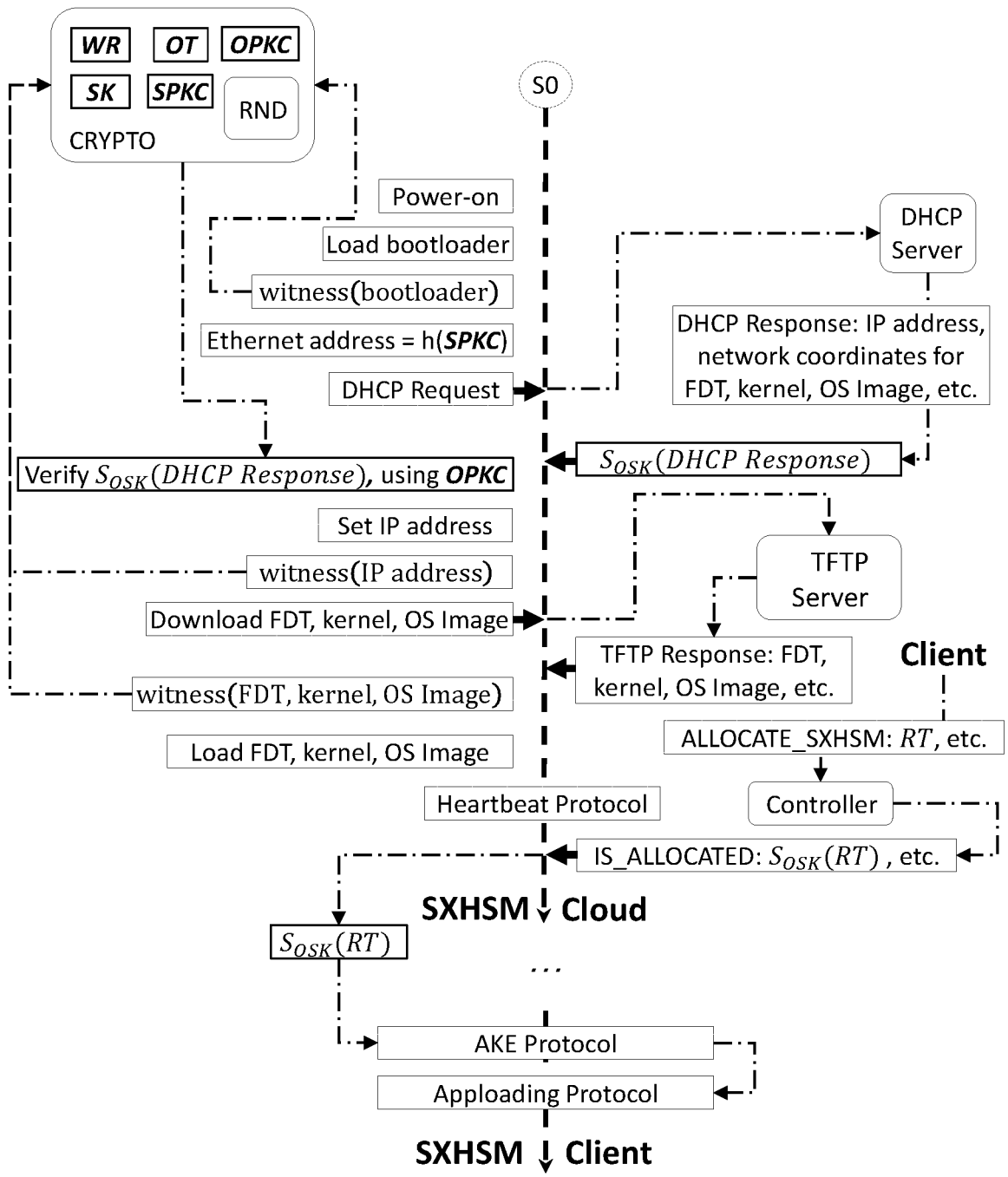
FIG. 5 shows a process flow of boot sequence interactions for an extended HSM built and deployed in accordance with the present invention.
Figure 6:
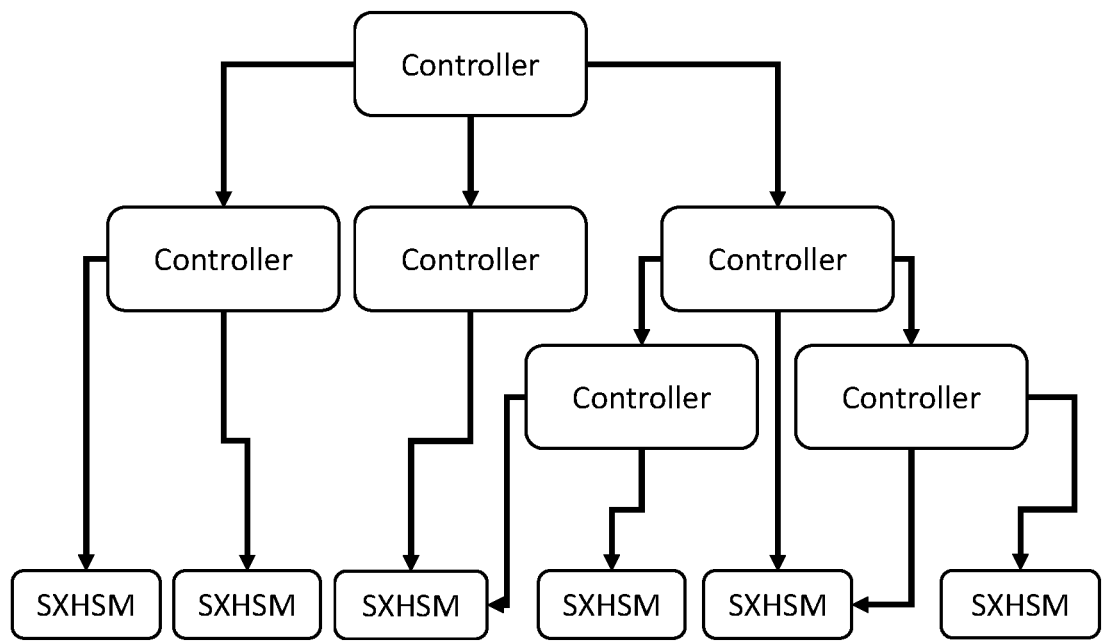
FIG. 6 is an organizational chart showing the control infrastructure for a plurality of extended HSMs built and deployed in accordance with the present invention.

Referring now to FIGS. 5 and 6, in one embodiment, a plurality of SXHSMs in a networked environment are managed by a control infrastructure (or CI) that includes at least one controller. As seen in FIG. 6, the CI may comprise a graph of controllers, with each controller potentially being controlled by one or more "graph parents" and controlling "graph children." As such, the CI may in fact comprise a hierarchy of controllers, organized in a logical tree, with each controller being controlled by its tree "parent" and controlling its tree "children."

Acting as part of (or the entire) CI, a controller may maintain information about SXHSMs, including their network identities and state. In graph or hierarchical implementations, a SXHSM's information may be maintained by multiple controllers.

In some embodiments, the CI may be granted access to the private key associated with the owner public key certificate OPKC, to enable the CI to authenticate its messages to an SXHSM.

As illustrated by FIG. 5, a SXHSM may start in an initial secure state and generate an initial network identity, such as an Ethernet address. The initial network identity may be derived from SPKC. For example, the network identity may comprise an Ethernet address composed of bytes derived from h(SPKC), a cryptographic hash of SPKC.

In the alternative, it is contemplated that a SXHSM may retrieve a network identity from a server. In such a case, the network identity may comprise a network address, such as an IP or Ethernet address. It is appreciated that the server may be of different types, including DHCP, FTP, HTTP, SSH, or TELNET.

In one embodiment, the SXHSM may witness information about the network identity.

Once a network identity is established, the SXHSM may retrieve a number of software and data component descriptions from a server. The component descriptions may comprise information on network locations of servers where the components can be retrieved from. The network locations may be provided in a variety of formats, including in standard URI or URL formats. When desired, the SXHSM may verify that the component descriptions are authorized and signed by the CI using the private key associated with OPKC and the SXHSM may witness information about one or more software component descriptions.

A SXHSM may also retrieve a number of software and data components from a server. The components may include a flattened device tree FTD description file, a bootloader, a kernel, an operating system image, system software, and application software. As with component descriptions, the SXHSM may verify that the components are authorized and signed by the CI using the private key associated with OPKC and the SXHSM may witness information about one or more retrievals.

It is contemplated that, in its normal operation, a SXHSM may execute a number of software components, some of which may have been downloaded from a server. Such executions may occur in the following order: bootloader, followed by kernel, followed by operating system, followed by system software, followed by application software (as illustrated in FIG. 2 and discussed above). During such sequential execution, it may be desirable for a current component to be responsible for loading the following component, in which case said current component is called the "loader" of said following component.

It is contemplated that the SXHSM may witness information about one or more executions. Such witnessing of the execution of a component may be initiated by its loader. Further, the SXHSM may witness information about executions in the time order in which the executions occur or information about executions in a different order than the time order in which the executions occur.

Heartbeats.

Figure 7:
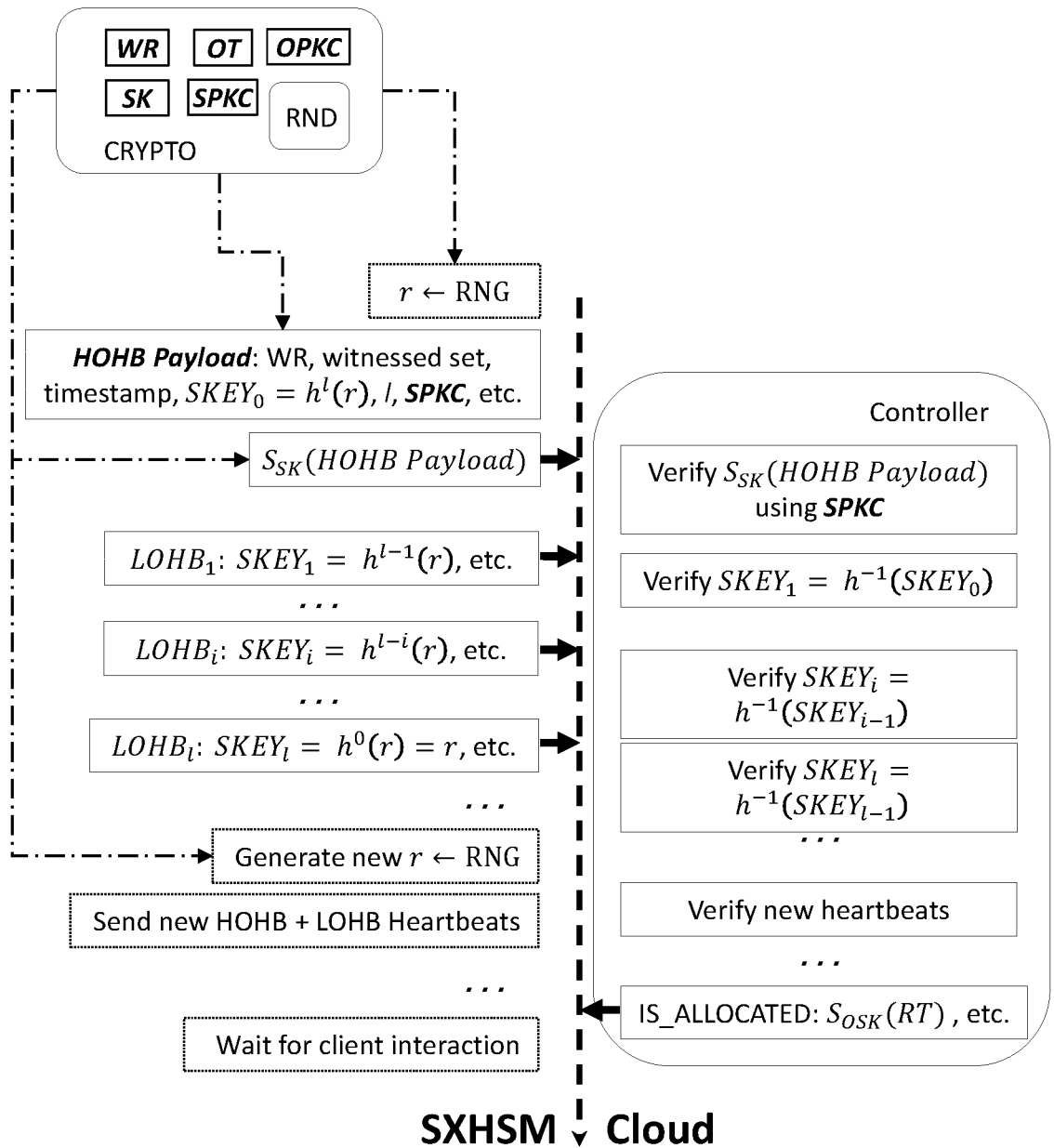
FIG. 7 shows a process flow of various heartbeats for an extended HSM built and deployed in accordance with the present invention.

Referring now to FIG. 7, once a SXHSM has been initialized, in one embodiment, the initialized SXHSM may announce itself to the CI by sending heartbeat messages. Such heartbeat messages may define a single heartbeat message or a plurality of heartbeat messages sent periodically. Each heartbeat message may be of two types: a high-overhead heartbeat (or "HOHB") that deploys expensive cryptography and a low-overhead heartbeat (or "LOHB") that may be verified faster and more efficiently.

When heartbeats are sent sequentially, they may be sent as a defined chain. For example, a HOHB could be followed by a pre-determined number (l) of LOHBs {LOHB1, LOHBl}. In such a chain, it is contemplated that the pre-determined number (l) of LOHBs following each HOHB may be fixed a-priori, or determined on the fly, e.g., from information in the previous HOHB message.

It is specifically contemplated that a HOHB from a given SXHSM may comprise at least one of:
 the current SXHSM witness register WR value;
 the witnessed set corresponding to the current WR—this may comprise the SXHSM network identity, the bootloader version, and/or the OS version;
 a nonce value known to both the SXHSM and the receiver of the heartbeat message; for example, the current timestamp at an agreed-upon time granularity to account for differences in clocks between the receiver and the sender of the message;
 $SKEY_0 = h^l(r) = h(h(h( \ldots h(r) \ldots )))$, the resulting value of composing a cryptographically-secure hash function $h( )$ with itself a fixed number of times (l) on a random input (r);
 the value l;
 SXHSM SPKC;
 one or more additional fields comprising encrypted, authenticated, or plaintext information (e.g., a unique identifier for the SXHSM), or a combination thereof; and
 one or more cryptographic signatures (e.g., with the SXHSM private key SK) on some or all of the previous fields combined.

A receiver may verify that the HOHB has been sent by a given SXHSM by verifying the cryptographic signature and whether said nonce value is as expected, e.g., the timestamp matches current time accounting for network transmission.

In order to avoid the possibility of unauthorized replays, in some embodiments, a given (nonce, private key SK) combination may not be used in any past or future HOHBs. Nonetheless, SXHSM may store for future use some or all of the values $SKEY_1 = h^{l-1}(r), \ldots, SKEY_{l-1} = h^l(r), SKEK_l = r$, which represent the elements of a cryptographic hash chain (SKEY chain).

In one embodiment, a low-overhead heartbeat LOHB may comprise the field $SKEY_i = h^{-1}(SKEY_{i-1})$, where $SKEY_{i-1}$ is the field from the previously sent HOHB—if this is the first LOHB to follow—or from a previously sent LOHB otherwise. It is acknowledged that this relationship may effectively place the LOHB in a "chain" of LOHB messages corresponding to the SKEY chain. LOHB, may comprise the field $SKEY_i = h^{l-i}(r)$.

As such, after receiving a HOHB, a receiver may have all the information needed to validate whether subsequent LOHBs are in the same chain, and thus are coming from the same receiver.

In one embodiment, the receiver may check whether the LOHB field $SKEY_i$ is in the expected relationship $SKEY_i = h^{-1}(SKEY_{i-1})$ with the immediately previous received LOHB's $SKEY_{i-1}$, or with the $SKEY_0$ value comprised in the HOHB message corresponding to this chain. Computing this inverse function $h^{-1}(SKEY_{i-1})$ is hard and should be impossible for ideal cryptographic hash functions. Advantageously, this prevents an unauthorized party from illicitly generating new HOHB messages from old ones.

In one embodiment, a receiver may also validate LOHB messages by verifying the equivalent relationship $SKEY_{i-1} = h(SKEY_i)$, which may be computed efficiently since it involves a single cryptographic hash computation. This mechanism may allow a receiver to perform the verification even if any intermediary LOHB messages are not received. For example, if $SKEY_1$, $SKEY_2$, $SKEY_3$ were sent, but only $SKEY_1$ and $SKEY_3$ are received, by checking that $SKEY_1 = h(h(SKEY_3))$, the verifier may ensure that the LOHB comprising $SKEY_3$ may be in the same chain with the one comprising $SKEY_1$.

Authenticating a SXHSM to a Control Infrastructure.

It is contemplated that the above-discussed owner public key OPKC may allow an SXHSM to authenticate messages from a CI, acting as its owner or designated representative thereof. Further, the SXHSM may use its secret key SK and the SPKC certificate to authenticate itself to the CI.

In the case of the SK being stored inside the SXHSM crypto chip, however, the SK may not be available to the code running on the main SXHSM CPU. Thus, the SXHSM may require an alternate mechanism to authenticate itself to the CI and other outside parties and establish a confidential and authenticated communication channel.

Such authentication may be achieved by having the SXHSM generate an "instance public/private key pair" and self-signing the instance public key (or IPK) with the instance private key (or ISK) to produce the instance public key certificate (or IPKC). The crypto chip may then use the secret key SK to sign a combination of the WR and the IPKC. The result $S_{SK}$(WR|IPKC) may be sent to the CI (as before, "|" denotes concatenation).

The CI may verify that WR indeed corresponds to a desired SXHSM state (e.g., initialized and loaded with the correct code stack).

The CI may use TLS or a similar established protocol to establish a secure authenticated communication channel with the SXHSM using the OPKC and IPKC credentials. This channel would then be available to be used to send control messages to the various components of the SXHSM.

Allocating SXHSMs.

In one embodiment, the CI is in charge of securely allocating SXHSMs to cloud clients. As an administrating device, the CI maintains meta-information about the SXHSMs in the system—meta-information comprising at least one of: SXHSM network identity, public key certificate SPKC, allocated client, and availability status.

Requests for the allocation of one or more SXHSMs are generally made by clients. A request from a client may be for any available SXHSM, or in some cases, may include specific properties that are required for the requested SXHSM. A client may also request desired additional changes to the SXHSM's internal state or operational state (defined herein as internal and external information that determines the HSM's internal operation and interaction with other components including, without limitation, information on past and current SXHSM network connections, currently running code, remote clients currently associated with the SXHSM, and network state including security firewall rules), including the creation of additional identities, changes in network security firewall rules, and connectivity to different networks.

In one embodiment, a client requests the allocation of one or more SXHSMs by sending an ALLOCATE_SXHSM message.

In response to a request, the CI may allocate SXHSMs by: (1) selecting suitable unallocated SXHSMs; (2) updating their associated meta-information accordingly including, without limitation, changing availability status and allocated client information; (3) notifying allocated SXHSMs using IS ALLOCATED messages; and (4) providing the client with identifying information for the allocated SXHSMs. It is contemplated that the identifying information may define the SXHSM network identity.

In one embodiment, the CI allocates SXHSMs by selecting suitable allocated SXHSMs and "queuing" the allocation requests until the allocated SXHSMs become unallocated.

Secure Use of the SXHSM

Figure 8:
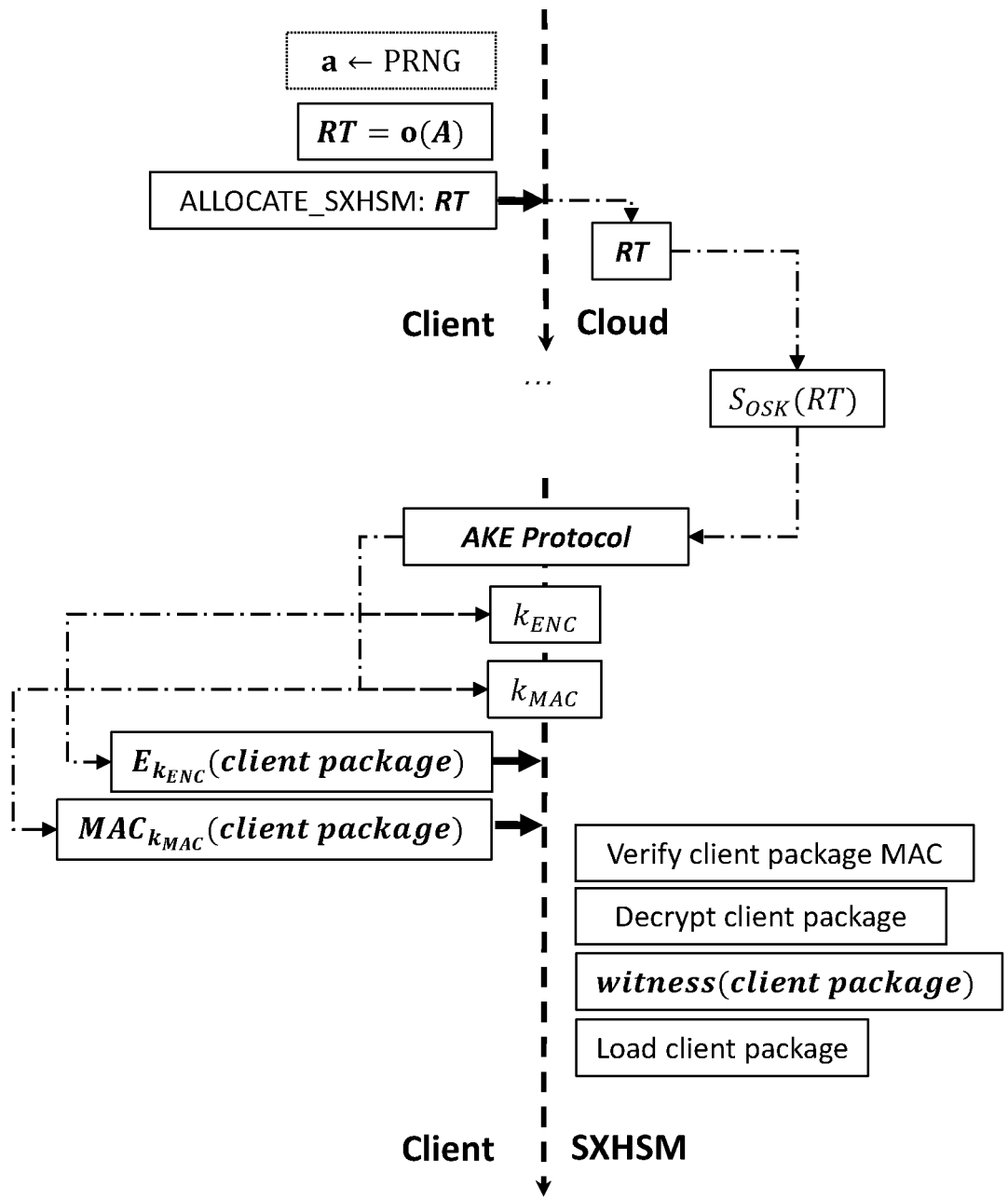
FIG. 8 shows a process flow of a weak and strong reservation token mechanism for an extended HSM built and deployed in accordance with the present invention.
Figure 9:
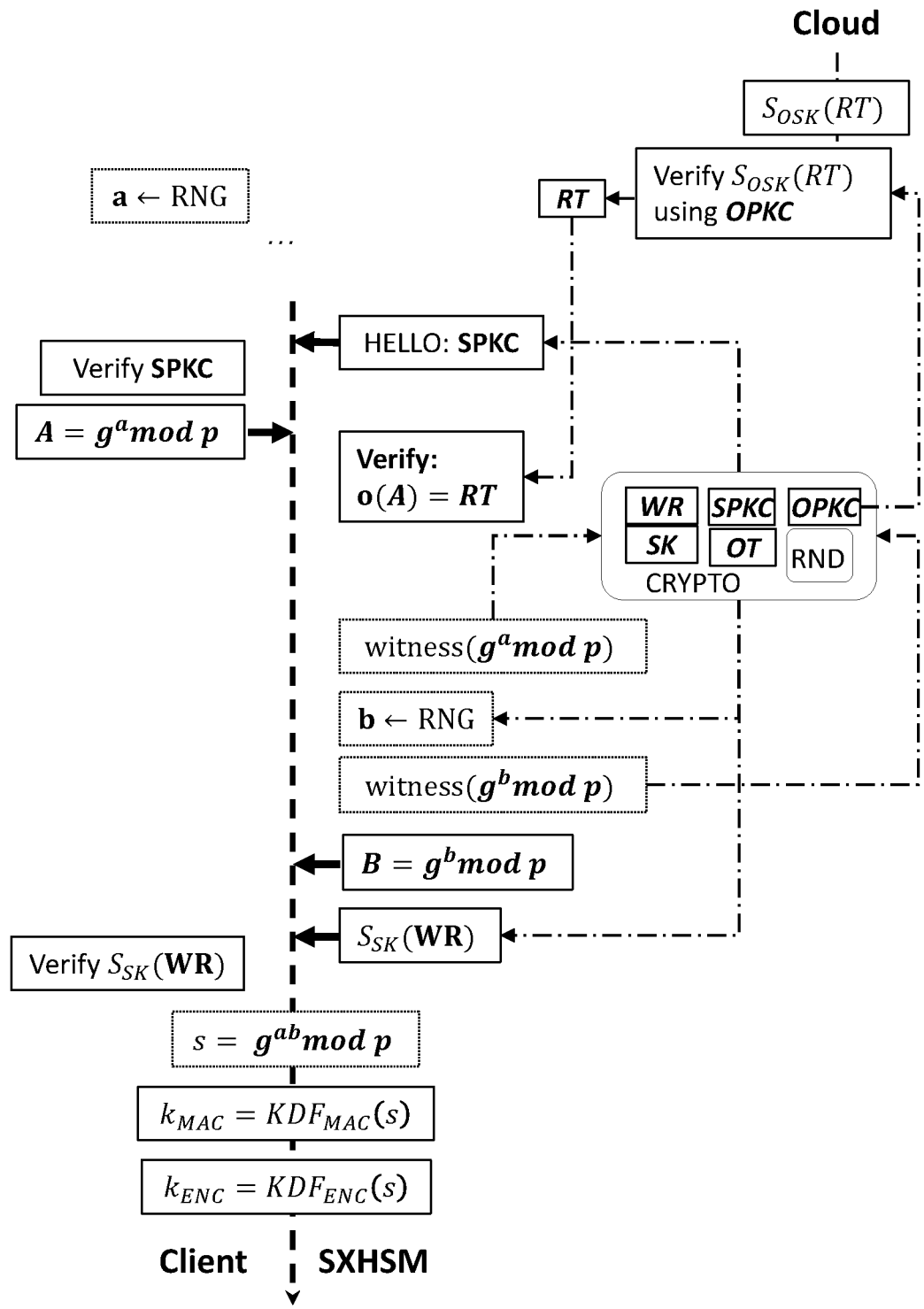
FIG. 9 shows a process flow of an authenticated key exchange ("AKE") Protocol with strong reservation token and AppLoading for an extended HSM built and deployed in accordance with the present invention.

Referring now to FIGS. 8 and 9, once a client has received information about an SXHSM that has been allocated for it, it may want to start using the SXHSM for its intended purpose, such as to host and run sensitive data and code. To this end, in addition to assurances that the SXHSM was indeed produced by a trusted vendor, a client may want to establish a secure communication channel with the SXHSM before sending it sensitive code and data. In some embodiments, a secure communication channel is established by encrypting and authenticating communication. Thus, a client may run a key exchange protocol to establish a symmetric encryption key and then use the symmetric encryption key to encrypt the communication.

It is appreciated that a client may also want to establish that the internal state of the SXHSM is secure and the SXHSM has loaded and is executing only legitimate expected code. This may be achieved by sending the SXHSM a request to prove it can cryptographically sign its current witness register WR combined with a nonce, using the SXHSM private key (SK), i.e., the ability to compute $S_{SK}$(WR|nonce). The nonce may be a value known to both the SXHSM and the client; for example, the current timestamp at an agreed-upon time granularity to account for differences in clocks between the SXHSM and the client. As mentioned above, a given (nonce, private key SK) combination may not be used in any past or future HOHBs, e.g., to avoid the possibility of unauthorized replays.

AKE Protocol.

In one embodiment, establishing the security of the internal SXHSM state may be achieved by modifying a conventional Diffie-Hellman key exchange protocol to combine it with SXHSM witnessing as follows. For simplicity and consistency with the Diffie-Hellman description above, we use Alice to denote the client and Bob to denote the SXHSM.

Bob witnesses the A it received from Alice, e.g., by calling the witness (A) function. Bob will also witness B. After step 3, Bob will also send Alice the current witness register (WR), cryptographically signed with the SXHSM private key (SK), namely $S_{SK}$(WR). Both Alice, the client, and Bob, the SXHSM, then compute a key derivation function (KDF) to derive a symmetric key k=KDF(s), from $s=g^{ab}$ mod p, the common DH master secret.

It is contemplated that the witnessing step may ensure that the key exchange values are imprinted in the WR digest and the SXHSM is effectively associated with Alice, the client. Sending back the $S_{SK}$(WR) value may also serve as an authentication step to prevent man-in-the-middle attacks.

In one embodiment, a Key Derivation Function (or KDF) is the identity function, KDF(x)=x. In this case, the DH master secret is used as a key directly.

In another embodiment, the KDF is implemented as a cryptographic hash of the input concatenated with a fixed string on either side (in the following "|" denotes concatenation); for example:

$$KDF_{MAC}(x)=h(\text{"this is a MAC KDF"}|x|\text{"this is a MAC KDF"})$$

$$KDF_{ENC}(x)=h(\text{"this is a simple KDF"}|x|\text{"this is a simple KDF"})$$

In one embodiment, the client and the SXHSM may use the KDF to derive different secrets from s. For example, they may use the KDF to compute a message authentication code (MAC) key $k_{MAC}=KDF_{ENC}(s)$, which may be used in message authentication), or an encryption key $k_{ENC}=KDF_{ENC}(s)$, which may be used for encryption, or both.

Application Loading.

In one embodiment, the client encrypts data and code (jointly called a "client package") with an encryption key $k_{ENC}$ and sends the client package to the SXHSM. It is contemplated, however, that the client may also provide the SXHSM with the network coordinates of a client package so as to allow the SXHSM to download a package from its network coordinates.

Other key combinations may be used to encrypt the package before sending it to the SXHSM.

For example, the client package may be encrypted with a package-specific key. The package-specific key may be encrypted in turn with the encryption key $k_{ENC}$ and provided to the SXHSM.

The key that is ultimately used to encrypt the client package, or client package transfer key, may be the package-specific key if any, or the encryption key $k_{ENC}$ if no package-specific key was used.

It is contemplated that the client may compute a client package MAC using a MAC key $k_{MAC}$ and send the MAC to the SXHSM.

In one embodiment, the encryption key alone is used to provide also integrity and authenticity. This may be achieved, for example, using authenticated encryption (AE).

Once the client package is received by the SXHSM, the SXHSM may decrypt the client package, may verify the client package integrity, may witness the client package, and may load the client package.

It is understood that a large number of other combinations are possible in which the client deploys the DH master secret to generate one or more cryptographic credentials that are then used to provide certain security assurances, such as confidentiality, integrity, and authenticity, for the interaction between the client and the SXHSM.

In one embodiment, the SXHSM verifies the security assurances for the received client package, and then loads it and runs the code within.

In one embodiment, the SXHSM application loading functionality is implemented through an Application Loader component.

The loaded client package may contain security credentials to secure additional interactions between the SXHSM-loaded code and external parties. For example, the client package may contain the private key of a public/private key pair that is then used to authenticate a software running in the SXHSM. The software could be a HTTPS server, an SSH protocol server, or other type. These software may then prove to remote parties that they are running securely inside SXHSMs.

Reservation Tokens.

It is contemplated that, when requesting an allocation of a SXHSM from the CI, a client may also provide a "reservation token" (or RT); for example, to the CI. In such a case, the RT may be provided to the allocated SXHSM, whether by the CI or otherwise. For example, in one embodiment, the IS_ALLOCATED message sent to the SXHSM may comprise RT.

It is contemplated that, in the AKE protocol, before altering the state of the SXHSM (e.g., before witnessing the A received from Alice), the SXHSM may receive from the client a "challenge token" (or CT). The SXHSM may then validate that the relationship between RT and CT is as expected before proceeding with the AKE protocol. A simple example is the case of the equality relation RT=CT. In this case, the SXHSM may simply verify that the client provided the correct CT=RT value.

In one embodiment, the RT may be a one-way function of A, RT=o(A), where A is the value Alice will provide in the AKE protocol. During the AKE protocol, before witnessing the A value and thus altering the SXHSM state, the SXHSM will first check if the received A is in the correct relationship o(A)=RT with the RT that the SXHSM had previously received during the SXHSM allocation process. This "strong reservation token mechanism" may resolve the issue of unauthorized attempts of taking control of the SXHSM after the allocation of the SXHSM but before the rightful client has initiated the AKE protocol.

Multi-Party Application Loading Key Agreement.

Using a multi-party key agreement protocol, any number of participants may take part in an agreement by performing iterations of the agreement protocol and exchanging intermediate data, which does not itself need to be kept secret. As a result, one or more SXHSMs may engage with one or more clients in a multi-party key application loading and key agreement protocol. This may reduce communication and computation overheads and result in increased efficiency and security.

Secure Storage Layer

The workloads executed by a SXHSM may need access to networked storage, such as provided by storage area networks (SAN), network-attached storage (NAS), distributed key-value stores, and other database facilities that provide storage. To ensure data confidentiality, however, it is desirable for the SXHSM to encrypt outgoing data and decrypt incoming data. In one embodiment, to ensure record-level integrity, the SXHSM may deploy cryptographic checksums on the outgoing and incoming data records. Furthermore, to ensure end-to-end store-level integrity, and prevent the storage layer from replaying old records and generally compromising the overall filesystem or data store integrity, the SXHSM may deploy integrity constructs, such as Merkle trees, or use filesystems that already provide such assurances, such as ZFS.

Whereas block-level integrity mechanisms are widely used to protect the confidentiality of data at rest, they do not prevent replay attacks or detect selective data removal. In these mechanisms, for efficiency, there is a one-to-one mapping between the protected blocks and their integrity checksums, and corrupting one data block will not be noticed, except by checking that specific block. However, for instance, if a malicious cloud provider wants to selectively remove storage data blocks, it can selectively replace these blocks with old, innocuous values. Such an attack can go unnoticed, potentially indefinitely. Store-level integrity mechanisms (also known as "volume level integrity") are designed to defeat against this and other attacks and provide guarantees of integrity at the entire volume level.

Additionally, many networked storage systems require credentials ("storage credentials") before access is allowed. For example, to use volumes in systems using the iSCSI protocol, a username and password are required.

But in a networked setting with a SXHSM, the CI may be in charge of allocating and setting up storage volumes and their access credentials. The CI, however, would typically be a distinct party relative to the party interested in using the storage volumes (e.g., the client of the SXHSM). Accordingly, it may be desirable for the CI to avail a combination of physically connected storage and networked storage of which the CI maintains control. By offering such a combination, the CI may offer storage service to the SXHSMs through a unified interface and mechanism that hides some of the complexity of the underlying storage mechanisms.

In one embodiment, the CI establishes storage credentials for different underlying storage components, such as servers and devices. The CI may send these storage credentials to the SXHSM encrypted and the SXHSM may use storage credentials to connect directly to a corresponding underlying storage component or to connect to the storage service interface offered by the CI.

Sharing of SXHSMs by Multiple Clients

Figure 10:
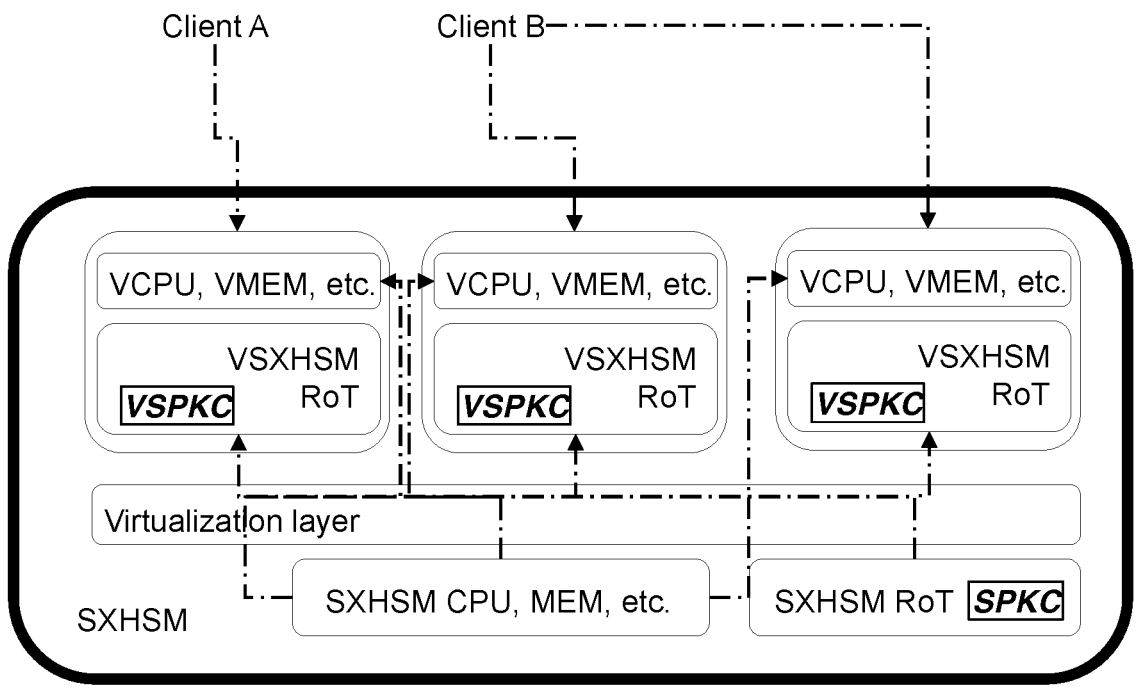
FIG. 10 is a schematic illustrating the sharing of an extended HSM built and deployed in accordance with the present invention between multiple parties through virtual machines.

Referring now to FIG. 10, advantageously, sharing of one or more SXHSMs by multiple clients may be achieved by deploying virtualization technology inside the SXHSMs to provide "virtual" SXHSMs (or VSXHSM) that may be implemented as virtual machines (VMs) or more efficient light-weight operating system-level virtualized containers similar to Linux containers (LXC).

As such, a single SXHSM "host" may run one or more VSXHSMs "guests," with each VSXHSM guest providing to remote clients the same functionality a traditional SXHSM would. In various embodiments, a guest VSXHSM may comprise the exact same logic/firmware/codebase as a standard SXHSM or a subset of the logic/firmware/codebase of a standard SXHSM.

Virtual Root of Trust.

In one embodiment, the host SXHSM may act as the RoT of a guest VSXHSM and establish a chain of trust rooted into the host SXHSM's own RoT. For example, upon creation of a guest VSXHSM, the host SXHSM may first send it a GENERATE_KEYPAIR message to establish a key pair associated with the VSXHSM. The SXHSM host will then act as a RoT of the VSXHSM and sign the public key returned by the VSXHSM using the host SXHSM's private key to generate a VSXHSM public key certificate (VSPKC)—similar in functionality to the hosts' SPKC certificate. In such an instance, remote clients may validate the SXHSM host SPKC certificate using the SXHSM RoT (e.g., trusted vendor) public key certificate, to verify that the host is indeed a genuine trusted SXHSM. Remote clients may also validate a VSXHSM guest's VSPKC using the host's SPKC to verify that the guest VSXHSM is indeed running inside a genuine trusted SXHSM host.

Virtualization of hardware.

When a SXHSM operates as a host, the host SXHSM may perform for the guest VSXHSM certain functions of the hardware components of a traditional SXHSM, in effect virtualizing their function for the guest VSXHSM. For example, in one embodiment, a host SXHSM may provide a "virtual network interface" functionality to a guest VSXHSM, with the host SXHSM using its underlying hardware network interface to implement the provided network interface functionality.

Similarly, a host SXHSM may provide "virtual crypto chip" functionality to a guest VSXHSM. The host SXHSM may use its underlying crypto chip to implement the provided functionality, such as compute cryptographic functions, encrypt, and decrypt.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of initializing a secure processing module for use over a computer network to allow the running of arbitrary client tasks on demand and secures sensitive data, code, and other information, the method comprising:
providing at least one secure processing module having a first processor, a memory, and a cryptography module interconnected inside an anti-tamper enclosure, wherein the processor is configured through instructions in said memory to selectively load and run a plurality of logical layers and the secure processing module is configured through said processor to run at least one application software program;
storing by said at least one secure processing module a first ownership credential in response to receiving a first communication;
authenticating by said at least one secure processing module a request from a second communication, wherein the second communication includes a submitted ownership credential and authenticating the request from the second communication includes validating the submitted ownership credential against the first ownership credential stored by said at least one secure processing module;
wherein validating the submitted ownership credential against the first ownership credential includes requiring a requesting party to prove knowledge of at least one of a set of one or several external ownership token derivatives, each such external ownership token derivative being a token that satisfies an agreed-upon ownership token relationship with the first ownership credential;
after authenticating the request from the second communication, accepting an ownership change by the at least one secure processing module, wherein accepting the ownership change includes at least one of (1) generating and storing a second ownership credential, and (2) changing an internal key pair;
receiving by said at least one secure processing module encrypted client software from a requesting party; and
providing an interface with client application software programs by said at least one secure processing module for the requesting party, wherein said client application software programs embody the encrypted client software after the encrypted client software has been decrypted and run on said secure processing module.

2. The method of claim 1, the method further comprising deploying said at least one secure processing module over a computer network, wherein deploying said at least one secure processing module includes:
establishing a secure communication channel between a client device of said requesting party and said at least one secure processing module;
receiving by said at least one secure processing module an encrypted client package containing at least one of client package data and client package software; and
decrypting by said cryptography module the encrypted client package, thereby availing the decrypted client package to the processor and allowing the processor to load any client package data in application software and run any client package software.

3. The method of claim 1, wherein said first communication is sent by a first party accessing said at least one secure processing module after an initial programming of said at least one secure processing module.

4. The method of claim 1, wherein said submitted ownership credential includes a value collectively computed by a number of parties which each have a respective individual ownership token derivative share, and wherein validating the submitted ownership credential against the first ownership credential includes verifying that at least a subset of said individual ownership token derivative shares relate to said first ownership credential.

5. The method of claim 1, wherein accepting the ownership change includes causing the at least one secure processing module to zero out at least a part of its internal state.

6. The method of claim 1, wherein the method additionally comprising storing by said at least one secure processing module an owner public key certificate corresponding to an owner private key, wherein the owner public key certificate and the owner private key allow said at least one secure processing module to authenticate a received message being signed by an owning party using said owner private key in accordance with asymmetric cryptography.

7. The method of claim 6, wherein the first ownership credential is defined by said owner public key certificate.

8. An apparatus for use over a computer network to allow the running of arbitrary client tasks on demand and secures sensitive data, code, and other information, comprising:
a secure processing module having a first discrete processor, a non-transitory memory, and a cryptography module interconnected inside an anti-tamper enclosure, wherein the processor is configured through instructions in said memory to selectively load and run a plurality of logical layers and the secure processing module is configured through said processor to run at least one application software program, wherein said memory additionally includes instructions which cause the secure processing module to perform operations, the operations comprising:

connecting to a computer network, thereby enabling the secure processing module to communicate electrical signals over the computer network;

receiving through the computer network a first communication, and in response thereto, store a first ownership credential;

receiving a second communication, wherein the second communication includes a request and a submitted ownership credential;

authenticating said request by validating the submitted ownership credential against the first ownership credential stored by said secure processing module;

wherein validating the submitted ownership credential against the first ownership credential includes requiring a requesting party to prove knowledge of at least one of a set of one or several external ownership token derivatives, each such external ownership token derivative being a token that satisfies an agreed-upon ownership token relationship with the first ownership credential;

after authenticating said request accepting an ownership change by at least one of (1) generating and storing a second ownership credential, and (2) changing an internal key pair;

receiving encrypted client software from a requesting party; and providing an interface with client application software programs, wherein said client application software programs embody the encrypted client software after the encrypted client software has been decrypted and run on said at least one secure processing module.

9. A computer software product arranged to execute on an apparatus, comprising a secure processing module, for use over a computer network to allow the running of arbitrary client tasks on demand and secures sensitive data, code, and other information, which apparatus comprises a first discrete processor, a non-transitory memory, and a cryptography module interconnected inside an antitamper enclosure, wherein the processor is configured through instructions in said memory to selectively load and run a plurality of logical layers and the secure processing module is configured through said processor to run at least one application software program, which computer software product, when executed, is arranged to cause the secure processing module to:

connect to said computer network, thereby enabling the secure processing module to communicate electrical signals over the computer network;

receive through the computer network a first communication, and in response thereto store a first ownership credential;

receive a second communication wherein the second communication includes a request and a submitted ownership credential;

authenticate said request by validating the submitted ownership credential against the stored first ownership credential;

wherein validating the submitted ownership credential against the first ownership credential includes requiring a requesting party to prove knowledge of at least one of a set of one or several external ownership token derivatives, each such external ownership token derivative being a token that satisfies an agreed-upon ownership token relationship with the first ownership credential;

after authenticating said request accept an ownership change by at least one of (1) generating and storing a second ownership credential, and (2) changing an internal key pair;

receive encrypted client software from a requesting party; and provide an interface with client application software programs, wherein said client application software programs embody the encrypted client software after the encrypted client software has been decrypted and run on said at least one secure processing module.

10. The method of claim 1, wherein each external ownership token derivative in the set of one or several external ownership token derivatives is a physical device that is physically connectable to said at least one secure processing module.

11. The method of claim 1, wherein each external ownership token derivative in the set of one or several external ownership token derivatives is configured to be used only a finite number of times or within a given time frame.

12. The method of claim 1, wherein each external ownership token derivative in the set of one or several external ownership token derivatives is provided during manufacture of said at least one secure processing module.

13. The method of claim 1, wherein each external ownership token derivative in the set of one or several external ownership token derivatives is provided subsequent to manufacture of said at least one secure processing module.

14. The method of claim 1, wherein accepting the ownership change includes causing the at least one secure processing module to replace said first ownership credential with another ownership credential.

* * * * *